June 13, 1944.    R. C. HENSHAW    2,351,427
VIBRATION DAMPING MOUNTING
Filed May 15, 1942    2 Sheets-Sheet 1

Richard C. Henshaw
INVENTOR.

BY W. L. Lord
ATTORNEYS.

June 13, 1944.     R. C. HENSHAW     2,351,427
VIBRATION DAMPING MOUNTING
Filed May 15, 1942     2 Sheets-Sheet 2

INVENTOR.
Richard C. Henshaw
BY
ATTORNEYS.

Patented June 13, 1944

2,351,427

UNITED STATES PATENT OFFICE 2,351,427

VIBRATION DAMPING MOUNTING

Richard C. Henshaw, Erie, Pa., assignor to Lord Manufacturing Company, Erie, Pa., a corporation of Pennsylvania Application May 15, 1942, Serial No. 443,105

5 Claims. (Cl. 248—5)

Under many conditions vibration damping mountings are subjected to abnormal impulses, and it is desirable to provide some means to limit the movement incident to this abnormal condition. This has been accomplished by providing snubbing devices or extensions on the mounting, and other expedients have been used.

In the present invention these extreme impulses are resisted hydraulically. This is very effective and requires comparatively small space. It is particularly applicable in limiting torque disturbances where the mounting is arranged to resist the torque impulses and particularly where this is accomplished by rubber resisting this movement in shear. Features and details of the invention will appear from the specification and claims.

Figure 1:
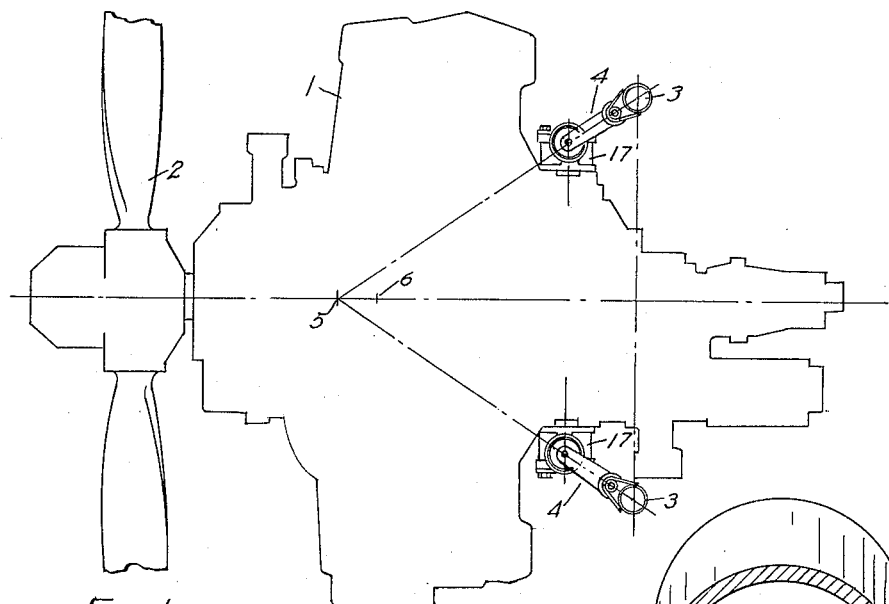

A preferred embodiment of the invention is illustrated in the accompanying drawings as follows:

Fig. 1 shows an elevation of an airplane engine provided with the mountings of the invention.

Figure 2:
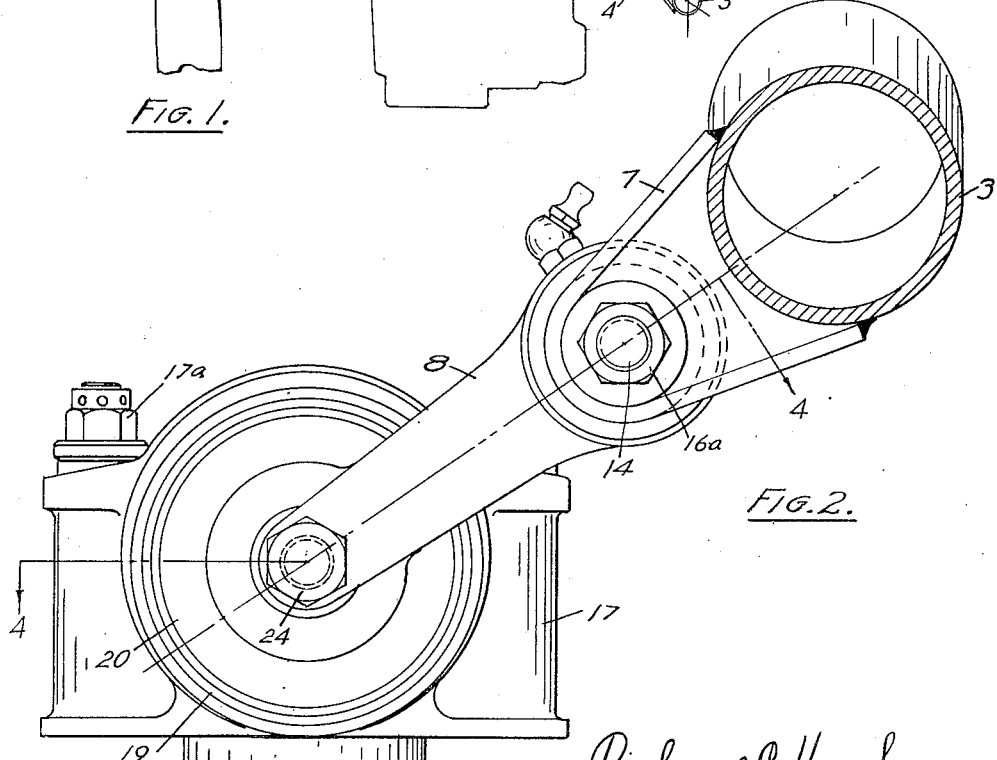

Fig. 2 an enlarged elevation of one of the mountings.

Figure 3:
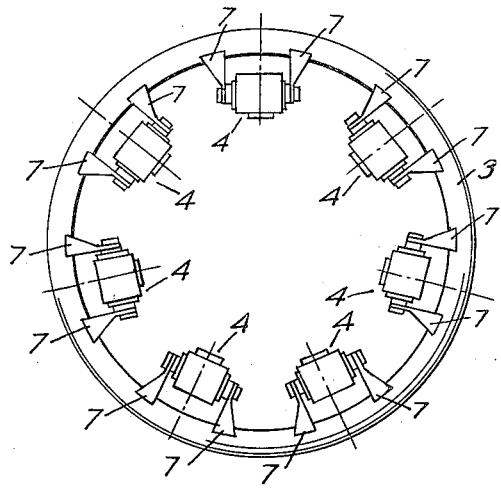

Fig. 3 an end view of the mounting assembly.

Figure 4:
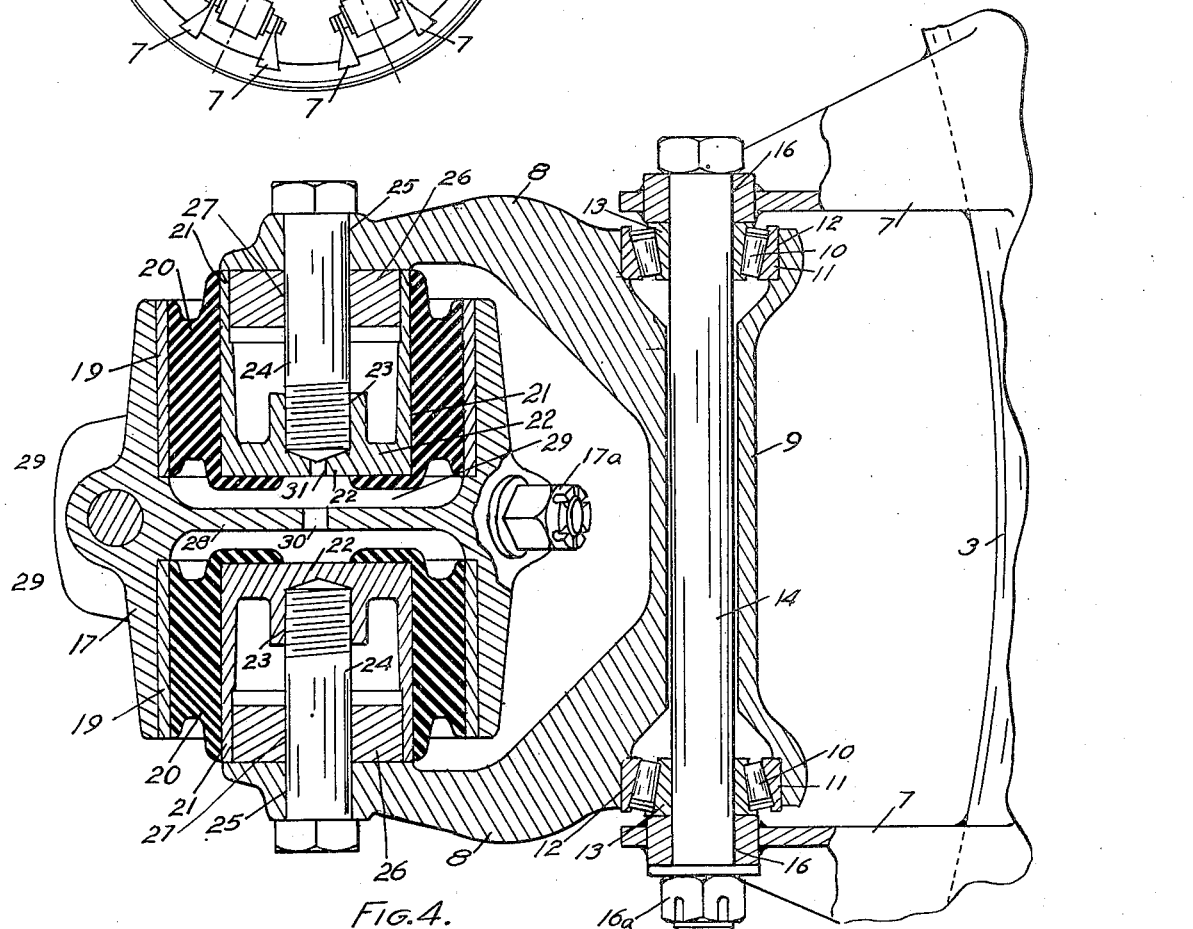

Fig. 4 an enlarged sectional view of a mounting unit.

1 marks the engine, 2 a propeller driven by the engine, 3 a mounting ring forming a part of the airplane structure, and 4 mounting units supporting the engine, preferably of the link type, and directed toward a focal point 5 preferably in advance of the center of gravity 6. Each unit has brackets 7 secured to the ring.

Links 8, which are U-shaped or forked, have ends 9. Roller bearings comprising rolls 10, outer raceway 11, and an inner raceway 13 are secured in sockets 12 in the ends of the cross member 9 of the link. A bolt 14 extends through the inner member and through perforations 16 in the bracket 7. The bolt is secured by a nut 16a.

A bracket 17 secured to the engine by bolts 17a has a sleeve 18. Outer shells 19 of a mounting bushing are forced into the sleeve. A cushion formed of resilient members 20 is secured, preferably by bonding, to the shells 19. Inner members 21 are secured to the resilient members, also preferably by bonding. These inner members have ends 22 with screw threaded sockets 23 and studs 24 extend through openings 25 in the ends of the forks of the link 8 into the sockets 23. Metal bushings 26 are arranged in the members 21, these having perforations 27 through which the studs 24 extend.

The resilient material thus shown is arranged tangentially around a circle parallel to the ring 3 and about the axis of the engine so that the torque impulses of the engine are resisted by the rubber in shear in these units. On the other hand, the links swing crosswise of the axis and converge with a focal point at 5, the swinging of the links permitting tangential freedom.

A space is formed between the opposing ends 22 of the inner members and this space is divided by a partition 28, thus forming cavities 29 at each side of the partition and at the oppositely faced ends of the resilient material. An opening 30 is arranged in the partition 28 and liquid is provided for the cavities. Any convenient method of introducing the liquid may be used, as through an opening 31.

During normal vibration the liquid does not seriously interfere with the freedom of movement. If the liquid completely fills the chamber, the elasticity of the rubber extending through the joint permits of a movement independently of the movement of liquid through the orifice 30. If greater freedom is required, a small portion of air may be trapped in the cavities.

If any abnormal vibratory action is imposed on the unit, the movement is definitely limited by the liquid dashpot effect that is applied.

What I claim as new is:

1. In a vibration damping mounting, the combination of inner and outer members, and resilient material, such as rubber, between the members forming a closure between the members and resisting relative longitudinal movement of the members in shear of the material, oppositely facing ends of the material providing opposing faces in fluid containing cavities having enclosing walls, one cavity being extended as the other is contracted through the flexing of the material as the inner and outer members are moved relatively to each other, said cavities being connected by a passage permitting a restricted movement of fluid from one cavity to the other.

2. In a vibration damping mounting, the combination of inner and outer members, and resilient material, such as rubber, between the members forming a closure between the members and resisting relative longitudinal movement of the members in shear of the material, said material being in separate units with spaced adjacent opposing ends providing opposing faces in separated cavities, one cavity being extended as the other is contracted through the flexing of the material as the members are moved longitudinally relatively to each other, said cavities being connected by a passage permitting a restricted movement of fluid from one cavity to the other.

3. In a vibration damping mounting, the combination of units each having an inner member, an outer member spaced from and surrounding the inner member, and resilient material, such as rubber, between the members forming a closure between the members and resisting relative longitudinal movement of the members in shear of the material, the inner ends of the units being spaced apart forming an intermediate space, means for dividing the space having a communicating passage therethrough, and attaching means secured to the inner member.

4. In a vibration damping mounting, the combination of a rotating body having torque impulses, torque resisting devices each having inner and outer members, and resilient material, such as rubber, between the members forming a closure between the members and resisting torque impulses of the body by relative longitudinal movement of the members in shear of the material, oppositely facing ends of the material providing opposing faces in fluid containing cavities having enclosing walls, one cavity being extended as the other is contracted through the flexing of the material as the members are moved longitudinally relatively to each other, said cavities being connected by a passage permitting a restricted movement of fluid from one cavity to the other.

5. In a vibration damping mounting, the combination of a body subjected to torque impulses, links swinging crosswise of the axis of the body and providing torque thrust receiving devices for the body, said devices each comprising inner and outer members, and resilient material, such as rubber, between the members forming a closure between the members and resisting relative longitudinal movement of the members in shear of the material, oppositely facing ends of the material providing opposing faces in fluid containing cavities having enclosing walls, one cavity being extended as the other is contracted through the flexing of the rubber as the members are moved longitudinally relatively to each other, said cavities being connected by a passage permitting a restricted movement of fluid from one cavity to the other.

RICHARD C. HENSHAW.